INVENTOR.
JOHN H. McNEIL
ROLPH B. WHITE, JR.
BY Hurvitz & Rose
ATTORNEY

Dec. 18, 1962 J. H. MacNEILL ETAL 3,069,674

CODING KEYBOARD MECHANISM

Filed Oct. 30, 1959 3 Sheets-Sheet 2

INVENTOR.
JOHN H. McNEIL
ROLPH B. WHITE, JR.
BY Hurvitz + Rose
ATTORNEY

INVENTOR
JOHN H. McNEIL
ROLPH B. WHITE, JR.
BY Hurvitz & Rose
ATTORNEY

United States Patent Office 3,069,674 Patented Dec. 18, 1962

3,069,674

CODING KEYBOARD MECHANISM

John H. MacNeill, Melbourne, and Rolph B. White, Jr., Eau Gallie, Fla., assignors to Soroban Engineering, Inc., Melbourne, Fla., a corporation of Florida Filed Oct. 30, 1959, Ser. No. 849,949
12 Claims. (Cl. 340—365)

The present invention relates to keyboard mechanisms and more particularly to a keyboard mechanism for producing electrically coded pulses indicative of a particular key depressed at any instant during operation of the apparatus.

The apparatus of the present invention constitutes an improvement of the coded keyboard described in our U.S. Letters Patent 2,836,809. In the mechanism described in the aforesaid patent, there is provided a plurality of longitudinally reciprocatable code bars having a plurality of teeth arranged along their longitudinally extending upper surfaces. The code bars are reciprocatable between a first and second position and in the first position all of the teeth on the various code bars are aligned transversely to the direction of movement of the bars. In order to produce a desired code, some of the teeth on each of the bars are removed and when one of the keys of the mechanism is depressed, it causes an actuator to enter a row of aligned slots between teeth on all of the code bars. Some of the teeth on the code bar adjacent the actuated key are removed so that when a mechanism is energized for biasing the code bars toward their second position, those code bars that have teeth removed from behind the actuator are able to move while those bars which do not have teeth removed from this location cannot move. The pattern of code bars that can move in response to actuation of each of the keys of the mechanism is different from the pattern of bars which can move for each of the other keys of the mechanism and switch mechanisms are employed to sense which of the code bars do move during any particular cycle of operation. Each switch associated with a code bar which moves during a cycle of operation, is closed and closes a circuit to an external apparatus which senses the pattern of voltages thus developed by the switches as an indication of the key that was depressed.

In the apparatus of the aforesaid patent each of the code bars has a spring which biases the code bar toward its second position. A stop member is provided which normally prevents the code bars from moving to the second position and when it is desired to transmit a code, the stop member is removed and the selected bars are permitted to move. At the end of a cycle of operation, the stop member is returned to its initial position and forces the code bars back to their first position. One difficulty which arises with the apparatus of the aforesaid patent is that the code bars are suspended from springs during the interval that they are permitted to move to their second position and therefore can bounce and produce several closings of their associated switches during each cycle of operation. If a switch is closed more than once during each cycle of operation, it may transmit a series of pulses and transmit inaccurate information to the external apparatus.

A solenoid is employed to operate the stop member and the apparatus for selectively energizing the solenoid comprises a pair of micro-switches each adapted to be closed in response to actuation of a different half of the keys of the keyboard. Each of these micro-switch actuators constitutes a bail having a main body portion extending longitudinally of the mechanism under each of the actuators and having right angle portions, the ends of which are pivoted to the frame of the machine. Such an arrangement is satisfactory so long as the keyboard is of conventional length. However, when the length of the keyboard must be greatly extended, particularly in special purpose applications, difficulty arises with regard to the bail members. When the bail is quite long, in order to provide sufficient rigidity of the bail to insure operation of the micro-switch regardless of the distance of the actuator from the micro-switch along the length of the bail, the bail must have a great deal of mass. To return a bail of such great mass to its unactuated position at the end of a cycle of operation, fairly heavy springs must be employed and in consequence the pressure which must be exerted upon a key to initiate an operating cycle becomes considerable and the entire keyboard has a very heavy feel to it.

Continuing with the description of the keyboard of the aforesaid patent, in order to insure that only one key is depressed at a time, a plurality of balls and a ball cage are employed. The ball cage is slotted so that each actuator has a section disposed in a slot in the cage and when the key is depressed, a portion of the key passes between two adjacent balls. The length of the cage with respect to the total diameter of the balls is such that only one actuator section can be disposed between the balls at one time. However, in the arrangement employed in the aforesaid patent, the actuator section adapted to ride in a slot in the ball cage is closely adjacent the mouth or opening of the slot when the key is unactuated. After extensive use of the keyboard, the ball cage may become slightly bent and the keys in their unactuated positions may no longer be seated in their associated slots. Therefore, upon depression of the key, the key may not enter the slot and, at times, contacts the surface of the cage so that the key cannot be operated.

In accordance with the present invention, all of the difficulties recited with respect to the keyboard of the aforesaid patent have been eliminated. Code bars are again permitted to move from a first to a second position by withdrawing a stop from their path of movement but in order to prevent bouncing of the code bars, the bars engage the rear surface of a plate upon which a plurality of code bar sensing switches are mounted. The rear surface of this plate is at least partially covered with a shock absorber material so that upon movement of the bars, they are positively stopped in a predetermined position and engage the shock absorber material so that they do not bounce.

With respect to the actuator bail, and the difficulties encountered with respect thereto, the pivoted bail is replaced with a reciprocating light weight bail which is disposed parallel to the code bars. The reciprocating bail is provided with a number of slots equal to the number of keys employed and each slot is adapted to be engaged by the actuator of the key upon the key being depressed. The slot slopes in such a direction with respect to the direction of movement of the bail that upon a wall surface of each of the slots being engaged by its associated actuator, the bail is urged towards its actuated position and operates a micro-switch or a contact which thereafter energizes a solenoid. Upon energization, the solenoid removes the stop from in front of the code bars and permits the selected code bars to move to the second position. Further, the solenoid holds the bail in its forwardmost position until the end of a cycle of operation, at which time the solenoid is de-energized, thereby preventing other keys from entering their associated slots in the bail during such a cycle.

A further feature of the apparatus resides in the fact that the section of the actuator which enters the slot in the bail is apertured and the portion of the bail immediately behind each slot has a hook-like shape which enters the aperture in the actuator and pulls the actuator down to its completely retracted position to both lock the key in its downward position to show that it has been selected and also to prevent the double actuation of a key during a single cycle which might result in a code being transmitted twice. The bail employed in the present invention may be a very light weight member. Since the bail does not pivot, it is not subject to torque and rigidity is insured by making the bail deep in the direction of application of force by the actuator key. However, since substantially no side thrust is exerted on the bail, its weight is kept low by making it quite narrow. Thus, even though the bail is light weight, it is completely rigid for the purposes of its utilization in the present invention.

With respect to the ball cage employed in the present invention, bending of the cage is prevented by securing it at a number of locations to the under side of an upper frame member which is also employed to guide the actuators. The actuators are prevented from coming out of the slots by providing that portion of the actuator which is disposed in a slot in the ball cage with an aperture which, when the key is in its unactuated position is aligned with the path of movement of the balls in the cage. A portion of the actuator above the aperture therein is disposed on the side of the ball remote from the opening of the slot and therefore it is not possible for the actuator to come out of the slot even if the ball cage becomes bent.

It is an object of the present invention to provide a coding keyboard having a longitudinally reciprocatable bail for energizing a drive means for a plurality of code bars.

It is still another object of the present invention to provide a keyboard having a plurality of keys and a bail for sensing actuation of a key in order to initiate operation of an output coding system, wherein a selected key is positively driven by the bail to its downwardmost position and locked in said position until a coded output has been transmitted.

It is yet another object of the present invention to provide a keyboard mechanism having a plurality of balls in a ball cage for preventing operation of more than one key at a time wherein it is not possible for the key to come out of its associated slot in the ball cage.

It is still another object of the present invention to have a plurality of code bars which are selectively movable from a first position to a second position in response to the actuation of a key wherein the code bars are biased from their first to their second position and are positively returned from their second to their first position at the end of the cycle of operation wherein the selected code bars engage a positive stop for limiting their movement from their first to their second position.

It is another object of the present invention to provide a keyboard mechanism having a ball and a ball cage arrangement for preventing actuation of more than one key and a power driven bail arrangement for locking down a selected key until the end of a cycle of operation and also for locking out unselected keys.

The above and still further objects, features and advantages of the present invention will become apparent upon consideration of the following detailed description of one specific embodiment thereof, especially when taken in conjunction with the accompanying drawings, wherein:

FIGURE 1 of the accompanying drawings is a perspective view of the keyboard of the present invention;

Figures 1, 4, 5, 6:
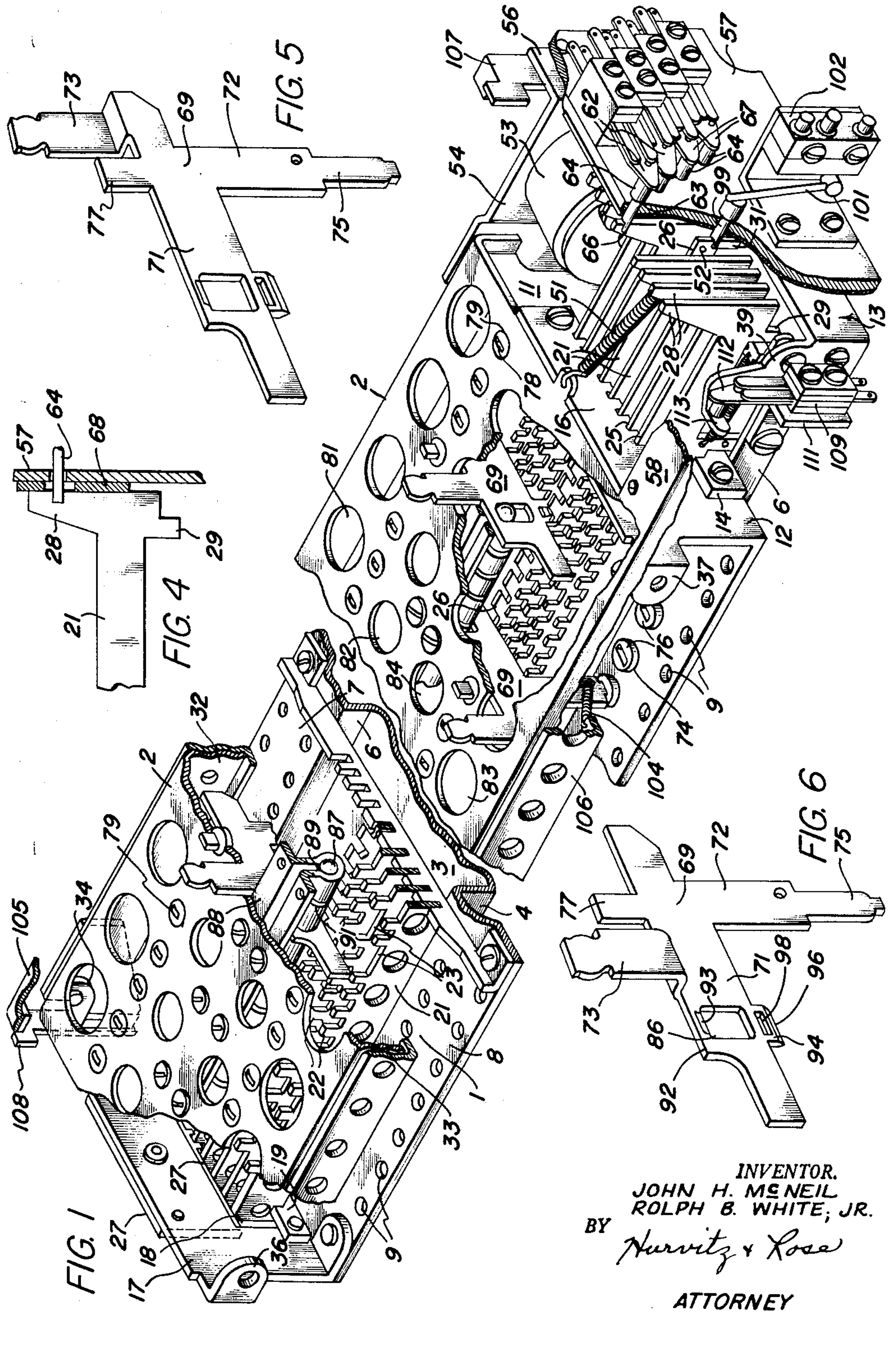
Figures 2, 3, 7, 8:
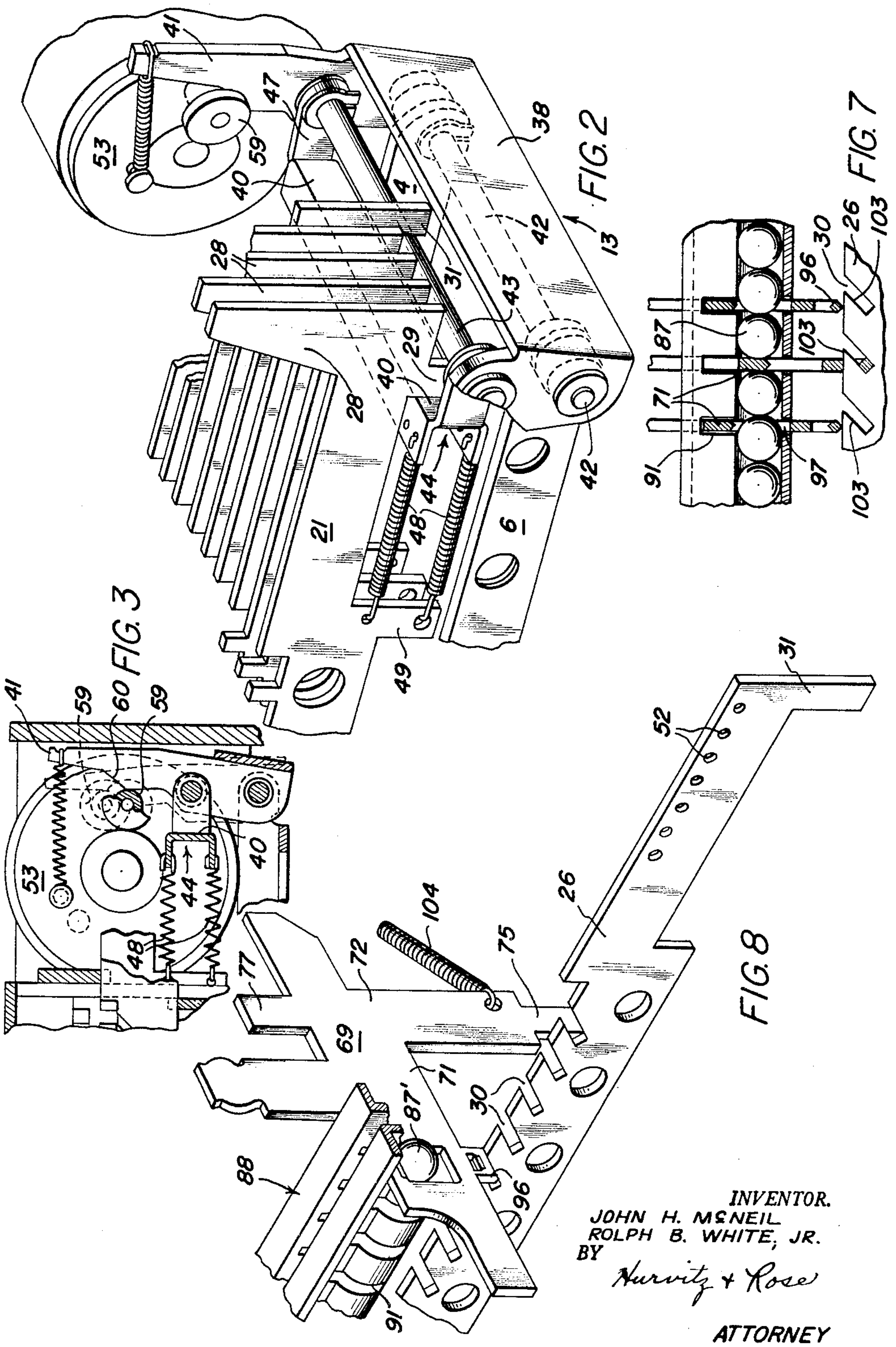
FIGURE 2 is an enlarged perspective view of the power drive mechanism of the present invention.
FIGURE 3 is a front view of a portion of the power drive mechanism of the present invention illustrating a drive coupling between a solenoid and an operating member.
Figures 9, 10, 11:
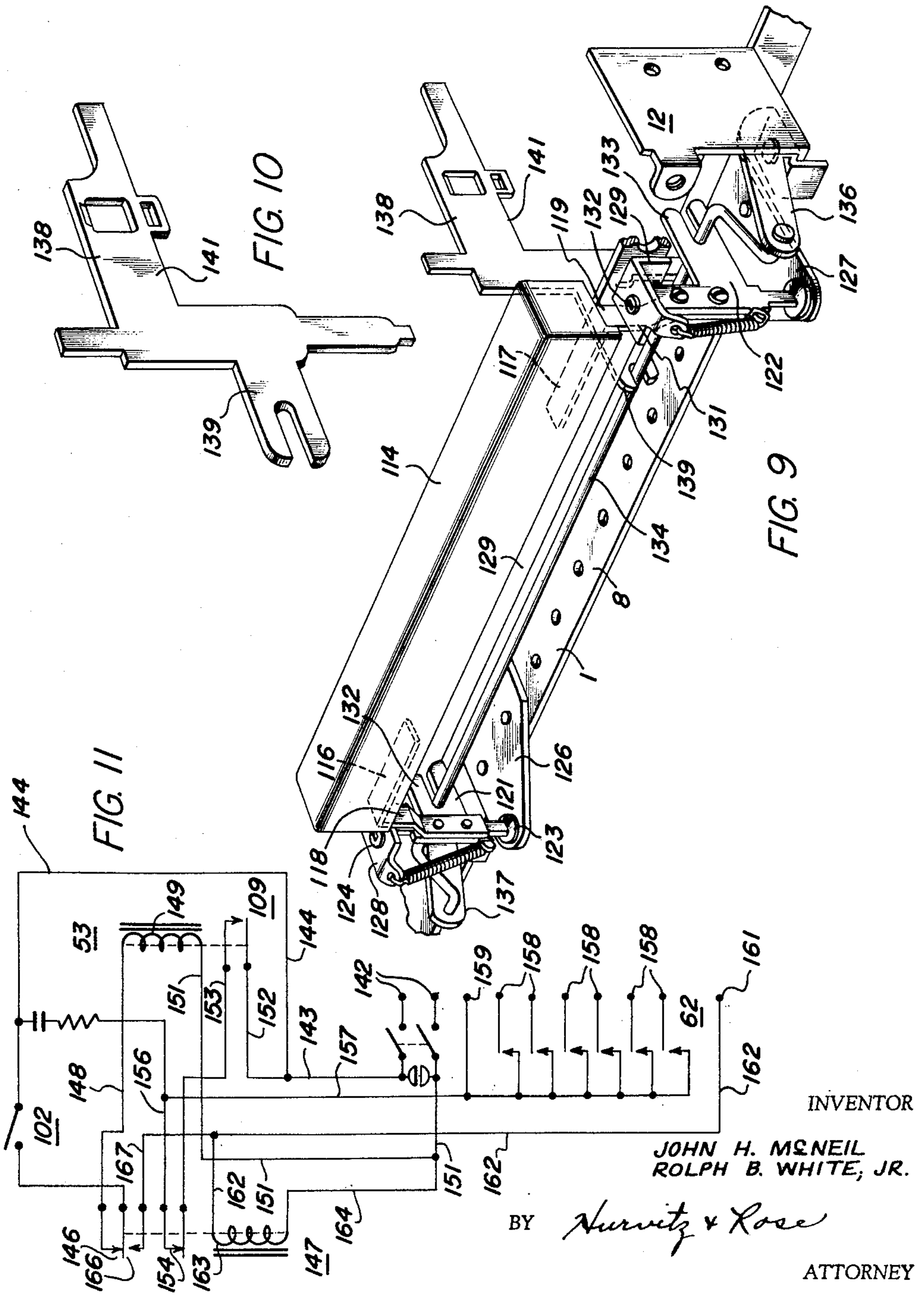

FIGURE 4 of the present invention is a partial vertical cross section of the code bars and their stop member;

FIGURE 5 is a perspective view of one of the key actuators employed in the apparatus;

FIGURE 6 is a perspective view of a second type of key actuator which may be employed with the apparatus of the present invention;

FIGURE 7 is a partial vertical cross sectional view illustrating the balls and ball cage and the latching feature of the bail of the present invention;

FIGURE 8 is a perspective view illustrating in detail the key actuator, the ball cage and the code bail;

FIGURE 9 is a perspective view of a mechanism for attaching a space bar to the apparatus of the present invention;

FIGURE 10 is a perspective view of a key actuator employed in conjunction with the space bar of FIGURE 9; and FIGURE 11 is a schematic wiring diagram of the control circuits for the apparatus of the present invention.

Referring specifically to FIGURE 1 of the accompanying drawings, the keyboard includes a bottom frame member 1 and a top frame member 2. The bottom frame member 1 has a longitudinally extending channel 3, extending from the left to right across the drawing as viewed in FIGURE 1 and having generally vertical walls 4 and 6. The walls 4 and 6 terminate at their upper ends in horizontal plates 7 and 8 each provided with a plurality of rows of longitudinally aligned apertures 9. The right end of the plates 7 and 8 are severed from the walls 4 and 6, respectively, and are turned vertically upward to provide front vertical walls 11 and 12 spaced apart by the width of the channel 3. The channel 3, including its side walls 4 and 6, extends to the right of the end walls 11 and 12 and provides (see FIGURE 2) a support for a code bar reset bail 13 to be discussed in greater detail subsequently. Disposed between the end walls 11 and 12 immediately above the side walls 4 and 6 is a lower code bar guide 14. An upper code bar guide 16 is disposed immediately above the guide 14 and is also secured between the end walls 11 and 12.

At the left end of the bottom frame member 1 as viewed in FIGURE 1, there is provided an end wall 17 secured as by bolting to the bottom frame member 1. The end wall 17 is provided with a centrally disposed aperture 18 and a second lower code bar guide 19 is secured to the end wall 17 and extends upwardly into the opening 18. A plurality of code bars 21 extend from adjacent rear wall 18 to adjacent the code bar reset bail 13 at the right hand end of the instrument. Initially all of the code bars 21 are identical and are provided with narrow slots 22 all of equal longitudinal length. The bars are coded by removing the metal between the adjacent slots 22 to provide long slots 23. The operation of the code bars in the system will be described subsequently. The ends of the code bars 21 adjacent the end wall 17 do not have slots in their upper surface so that both the upper and lower surfaces of the bars are smooth. The lower surfaces of the code bars 21 are disposed in individual slots 24 in the bottom guide plate 19 so as to provide lateral vertical stability and lateral positioning for the individual code bars. The number of code bars employed depends upon the type of code it is wished to transmit and anywhere from five to eight code bars are conventional. The bottom guide 19 must have a number of slots equal to the number of code bars and one further slot to accept an interlock bail 26.

The bail 26 is disposed between two groups of four code bars 21 and is also supported in one of the slots 24 in the guide 19. The bail 26 is adapted to reciprocate from a left to a right position and is provided with a plurality of slots 30 corresponding in number to the number of slots 22 of the code bars 21 and being aligned therewith. The left ends of the code bars 21 and the actuator bail 26 are maintained in the slots 24 in the guide 19 by means of a code bar retainer plate 27 which is secured to the back wall 17 and extends downwardly into the region of the aperture 18 in the end wall 17 and terminates just above the upper surfaces of the code bars 21 and the actuator 26. The plate 27 therefore prevents the code bars and actuator from moving upwardly and out of the slots 24. The right ends of the code bars 21 and actuator 26 also terminate in a portion having smooth upper and lower surfaces and these members are seated in suitable slots 25 in the lower and upper code bar and actuator guides 14 and 16. The code bars 21 extend past the guides 14 and 16 and terminate at the right ends as viewed in FIGURE 1 in an upwardly extending shoe 28 and a downwardly depending finger 29 for purposes to be described subsequently. The actuator bail 26 also extends forwardly of the guides 14 and 16 and into the region of the code bar reset bail 13 and terminates in a downwardly extending finger 31.

The top of upper frame member 2 has downwardly extending flanges 32 and 33 which lend rigidity to the top frame member 2 and further are employed to support it above the bottom frame member 1. Specifically, the side flanges 32 and 33 are engaged by ears 34 and 36 formed on the end wall 17 and disposed perpendicular thereto. Likewise, the end walls 11 and 12 have ears 37 formed thereon (the ear 37 associated with the wall 12 being the only one illustrated) and these also are bolted to the downwardly extending flanges 32 and 33 of the upper frame member 2.

Returning now to the description of the code bar reset bail 13, the bail comprises a cross member 38 and two side arms 39 and 41 positioned at right angles to the cross member bar 38 and extending upwardly therefrom. The bail 13 is pivotally secured to the right ends of the side walls 4 and 6 of the frame member 1 by means of a pin 42 which extends through the side arms 39 and 41 and through the vertical walls 4 and 6. A further rod 43 extends between the side arms 39 and 41 and is disposed immediately to the right of the downward extensions 29 of the code bars, all as viewed in FIGURE 2 and immediately to the left of the downward extension 31 on the bail 26. A code bar spring hanger 44 includes a channel-shaped member 40 extending transversely to the longitudinal axis of the frame of the apparatus behind the downwardly depending arms 29 of the code bars 21. The spring hanger 44 has rearwardly extending ears 46 and 47 disposed on opposite sides thereof which are apertured and are supported by the cross rod 43 extending between the arms 39 and 41. A plurality of springs 48, two for each code bar, extend between the upper and lower arms of the channel member 40 of the spring hanger 44 and a downwardly extending finger 49 on each of the code bars 21. The fingers 49 are normally disposed just forward of the lower code bar guide 14.

In operation, if the bail 13 is rotated clockwise about the shaft 42, the rod 43 pulls forward on the downwardly depending finger 31 of the bail 26 and also pulls the code bars 21 forward under the force of the springs 48. Upon the reset bail 13 being rotated counterclockwise to the position illustrated in FIGURE 1 of the accompanying drawings, the cross bar 43 pushes against the downwardly depending fingers 29 of the code bar 21 and returns them to their initial position, the bail 26 being returned by a spring 51 extending from the top frame member 2 to a suitable aperture 52 formed on the bail 26 adjacent the downwardly depending finger 31.

In order to produce controlled rotation of the bail 13 about the shaft 42, there is provided a rotary solenoid 53 supported by means of a plate 54. The plate 54 is secured to the frame by bolting to the ear 37 formed on the wall 11 and further by having a foot portion (not illustrated) bolted to the plate 7 through an appropriate hole 9 formed therein. The plate 54 extends longitudinally of the apparatus and terminates in a front flange 56 which extends outwardly of the mechanism and is at right angles to the main body of the plate 54. A coding contact plate 57 is secured to the right-hand surface of the flange 56 immediately in front of the vertical shoes 28 of the code bars 21. The other side of the plate 57 is supported by means of a flange (not illustrated) similar to the flange 56 which is carried by a forward extension 58 of the top frame member 2.

The rotary solenoid 53 is secured to the plate 54 and is disposed between the wall 11 and the coding contact plate 57 on the one hand and between the plate 54 and the coding bars 21 on the other. The arm 41 of the bail 13 extends substantially vertically upward and engages a drive pin 59 of the rotary solenoid 53. The rotary solenoid is a device which, upon energization, causes the drive pin 59 to rotate clockwise about the center of the solenoid and in so doing causes the arm 41 of the reset bail 13 and consequently the entire reset bail to rotate clockwise about the shaft 42. The arrangement of the rotary solenoid 53, the drive pin 59 and arm 41 is such (see FIGURE 3) that when the solenoid is energized and has completed its maximum clockwise movement, any bounce which may be imparted to the pin 59 as a result of rotation of the solenoid 53 is not transmitted to the arm 41 of the reset bail 13. As a result, movement of the pin 61 produces very little if any movement of the arm 41 and therefore, any bounce incident to operation of the rotary solenoid 53 is not transmitted to the arm 41 of the reset bail 13. Since the reset bail 13 controls movement of the code bars 21, any bounce transmitted to the reset bail 13 would be transmitted to the code bars 21 and to the contacts which they actuate which will be described subsequently. Such bounce would result in several closings of a set of contacts associated with the code bars 21 and produce spurious signal information which cannot be tolerated in such a mechanism.

The specific arrangement for preventing bounce of the pin 59 being imparted to the arm 41 relates to contouring of the surface of the arm 41 engaged by the pin 59. In its de-energized position, the dotted line position of FIGURE 3, the pin 59 engages the upper end of a surface 60 of the arm 41 which extends downwardly and sharply to the left as viewed in the aforesaid figure. Upon energization of the solenoid 53, the pin 59 is rotated clockwise and, due to the slope of the surface 60, produces rapid rotation of the arm 41 clockwise. The surface 60 terminates in its lower end in a surface 61 which is substantially vertical when engaged by the pin 59 at the end of the latter's stroke. At this time the pin 59 lies just slightly below the horizontal through its center of rotation and therefore little horizontal motion is imparted to the pin 59 during the amount of rotation that is likely to be encountered due to bounce. This fact taken in conjunction with the vertical slope of surface 61 insures that extremely little movement is imparted to the arm 41 as a result of bounce of the solenoid 53.

A plurality of sets of contacts 62 are secured to the front of the contact plate 57 in a generally staggered relationship. The plate 57 is provided with a plurality of apertures 63, there being one aperture aligned with each of the code bars 21. Each aperture is transversely aligned with a different one of the code bars 21 and a pusher rod 64 extends through each of the apertures 63. The end of the pusher rod 64 adjacent the shoe 28 of each code bar 21 is bifurcated to form a yoke 66 which straddles the end of the shoe 28. The other end or right-hand end of the pusher rod 64, as viewed in FIGURE 1, is disposed behind a movable contact 67 of each of the sets of contacts 62 and when the code bar 21 moves forward, the pusher rod 64 causes the movable contact 67 of the set of contacts 62 to engage its associated stationary contacts.

A body 68 of shock absorber material is disposed on the left surface as viewed in FIGURE 1 and also FIG- URE 4 so as to be interposed between the shoe 28 of the code bar 21 and the left surface of the plate 57. When the solenoid 53 is energized and the selected code bars are permitted to move towards the plate 57, the shoe 28 contacts the shock absorber 68 and bounce of the code bar 21 is prevented. Also, the body of shock absorber material 68 provides a positive stop for the code bar 21 so that the actuated position of the code bar 21 is always the same and, as a result, the contact 62 may readily be adjusted to insure operation whenever its associated code bar 21 is actuated.

Selection of the code bars to be actuated; that is, to be moved to the right, as viewed in FIGURE 1, upon energization of the rotary solenoid 53 is effected by a plurality of actuators 69. As will be explained subsequently, several different types of actuators may be employed in the mechanism but all of them are basically the same.

Referring specifically to FIGURE 6, the actuator 69 comprises a horizontal cross member 71 and a vertical support and guiding member 72. Further, there is provided an upwardly extending arm 73 adapted to carry a marked key button on its upper end and by means of which the actuator is depressed by the operator. The arm 71 is of approximately one-third the thickness as the slots 22 in the code bars 21 and is of such a length that it extends over the top wall of the code bars 21, there being 8 code bars in the apparatus illustrated in the accompanying drawings. The support leg 72 has a lower portion 75 of reduced width which is adapted to be seated in and reciprocated in a washer 74 having a rectangular slot 76 for receiving the portion 75 of the key. The washer 74 is disposed in the inner recess of holes 9 in the plates 7 and 8. The upper portion 77 of the vertical member 72 is disposed above the cross member 71 and is adapted to be received in a rectangular slot 78 in a washer 79 in the upper frame member 2. More particularly, a first row of the washers 79 is arranged between two rows of circular apertures 81 and 82 toward the rear of the mechanism while the second row of washers 79 is arranged between two further rows of apertures 83 and 84. The washers 74 in the bottom plate frame member 1 are arranged in rows such that each washer is vertically aligned with one of the washers 79 in the upper frame member 2. The finger 73 of the actuator 69 extends upwardly through one of the apertures 81, 82, 83 or 84, and it will be apparent by examining the relative positions of the apertures 81, 82, 83 and 84 and the washers 79 and 74 that the same key 69 does not fit all locations. The keys illustrated in FIGURE 1 are of two types in which the upwardly extending fingers 73 are disposed in apertures transversely aligned with washers 79. Two keys other than those illustrated in FIGURE 5 may be employed for utilization with the apertures 81—84 which are not transversely aligned with the washers 79. In FIGURE 5 there is illustrated a key 69 that may be employed with the rows 81 and 83 of apertures while in FIGURE 6 there is illustrated a key which may cooperate with rows 82 and 84. The finger 73 of the keys illustrated in both of these fingers may be disposed on either side of the cross member 71 depending upon which particular aperture in the plate 2 it is to extend through.

Each of the keys 69 is provided with an aperture 86 in its cross member 71, the aperture 86 in each of the keys always being the same distance from the center line of the vertical member 72 of the key. The aperture 86 is normally aligned with a row of balls 87 disposed in a ball cage 88 which is secured to the underside of the upper frame member 2 and extends longitudinally directly above the bail 26. The cage 88 is provided with a ball receiving channel 89 in which the balls 87 may roll freely. The cage 88 has also a plurality of vertical slots 91 formed therein which extend across the channel 89. The slots 91 extend almost to the top of the cage 88 and each is adapted to receive a cross member 71 of the key 69 in the region of the aperture 86. More specifically, and reference is now made to the FIGURE 6, when the key 69 is in its undepressed or unactuated position, a web of material 92 above the aperture 86 is disposed in the slot 91 above the channel 89 and out of the path of movement of the balls 87. The web of material 92 is sharpened or coined to produce a knife edge 93 so that when a key is depressed it may readily pass between the balls 87 (see FIGURE 7). The spacing between the balls 87 is such that when one of the web portions 92 of the actuator 69 is passed between two adjacent balls, all of the space between the balls is taken up and no other actuator 69 can be depressed. This feature provides for a positive lockout of all but the selected or actuated key, and therefore prevents two keys from being depressed simultaneously.

Disposed immediately below the aperture 86 in the cross member 71 of the actuator 69 is a downwardly extending U-shaped member 94 having a base member 96 of a generally diamond-shaped cross section as illustrated in FIGURES 6 and 7. The U-shaped member 94 defines a further aperture 98 between the main body of the cross member 71 and the base member 96 of the U-shaped member 94 and when a key is depressed, the cross member 96 enters one of the rearwardly sloping slots 30 in the bail 26. The sloping surface of the portion 96 of the U-shaped member 94 engeges the forward sloping surface of the slot 30 and produces a small forward movement of the bail 26. The front of the bail 26 is adapted to engage a pusher rod 99 of the same type as the pusher rod 64, described previously, which engages an arm 101 of a micro-switch 102 or contacts such as 62, mounted on the plate 27. The forward motion imparted to the bail 26 by a small downward movement of a key 71 is sufficient to actuate the switch 102, which is connected in circuit so as to energize the rotary solenoid 53. Energization of the rotary solenoid 53 produces clockwise rotation of the bail 13 which, depending upon the setting of the contacts of the microswitch 102 may be closed at the end of the stroke of the bail 26 in which case the shaft 43 holds the bail in its actuated position or the contacts may be closed before the bail 26 completes its stroke in which case, the shaft 43 drives the bail 26 to its forward position and holds it there.

Upon forward movement of the bail 26, its sharp leading edge 103, defined by the rearward edge of the slot 30 and the upper surface of the bail, enters the aperture 98 defined by the cross member 71 and the U-shaped member 94 and engages the sloping surface of the base 96. As a result, the key 71 is pulled downward until the bail 26 engages the shock absorber material 68 on the rear of the contact plate 57 at which time the cross member 96 is seated at the bottom of the slot 30. It will be noted that in this position, the slots associated with unselected actuators 69 are forward of the U-shaped members 94 of these actuators so that they are locked out and cannot be depressed. When the rotary solenoid 53 is de-energized the spring 51 tends to return the bail 26 to its lefthand-most position as illustrated in FIGURE 1 thereby tending to release the key 71 from under the projection 103. The keys are returned to their uppermost position by key-return spring 104 extending between the lower region of the vertical member 72 of the key 69 and side plates 106 which are secured to the side plates 32 and 33 respectively of the upper frame member 2.

It can be seen from the above that the ball cage 88 may be rigidly secured to any number of desired locations to the under side of the frame member 2 and therefore the possibility of bending of the cage is virtually eliminated. Further, the actuator 69 is arranged with respect to the cage 88 so that it cannot possibly come out of the slots 91 since at all times a portion of the key is at least a quarter of an inch into the slot, which is well in excess of any possible bending of the cage 88. Another feature of the invention is that the touch of the system is very light since very little pressure must be exerted by the operator in order to produce the required forward motion of the bail 26 to bring the power system into operation. The bail 26 is quite light due to its narrow width and therefore the spring 51 need be only a light weight spring. As a result, the amount of force which must be exerted by the operator to produce sufficient movement of the bail 26 to operate the power system, is quite small. The reason that the bail 26 may be made so light is that although it is quite narrow, its depth or vertical height is sufficient to withstand any tendency to bend as a result of engagement by the actuators.

The apparatus is provided with a key plate 105 which is not illustrated but which is supported by support members 107 and 108. The member 107 is bolted to the left surface of the flange 56 of the plate 54 and extends upwardly therefrom while the support 108 is bolted to the frame member 2. The apparatus is provided with two additional key plate supports (not illustrated) one corresponding to the support 107, it being disposed behind the vertical flange extending downwardly from the forward end of the extension 58 of the plate 2 and a still further support which corresponds to the support 108 and is secured to the other side of the left end of the frame member 1.

The apparatus is provided with a switch 109 which is supported by a right angle member 111 secured to the forward extension of the side wall 6 of the channel 3. This switch 109 has a movable leaf spring contact 112 which is adapted to be engaged by a finger 113 formed on the upper end of the arm 39 of the bail 13. The movable contact 112 is moved into engagement with its stationary contacts when the bail 13 is rotated clockwise. In addition, an anti-repeat relay 115, the purpose of which will become apparent subsequently may be secured to the forward extension 58 of the frame member 2 between the wall 12 and plate 54 adjacent the forward code bar 21.

If desired, the apparatus of the present invention may be provided with a space bar and reference is now made to FIGURE 9 of the accompanying drawings. The space bar 114 is provided at either end with a right angle support member 116 and 117. The members 116 and 117 are secured to under-surfaces of the bar 114 and extend vertically downward therefrom. Vertical downward extensions 118 and 119 of the space bar supports 116 and 117 respectively are secured to space bar keys 121 and 122 respectively. The key 121 is supported for reciprocating motion in a bottom washer 123 and a top washer 124. The washer 123 is disposed in an aperture in a horizontal plate 126 which is bolted or otherwise suitably secured to the plate 8 of the bottom frame member 1. The space bar key 122 is similarly supported at its lower end in a plate 127 also supported by the plate 8. The upper washer 124 for the space bar key 121 is supported in a horizontally outwardly extending finger 128 of a bar 129 which is secured to the plate 106 which is in turn secured to the downwardly extending flange 33 of a top frame member 2. The bar 129 extends to the region of the key 122 and is provided with a second horizontally extending finger 131 which receives a washer 132 for supporting the upper end of the key 122. The keys 121 and 122 have forked fingers 132 and 133 respectively which extend toward the frame members 1 and 2. A space key equalizer bar 134 is disposed in the slots in the ends of the keys 121 and 122 and is pivoted at its right end as viewed in FIGURE 9 in a member 136 which is secured to the frame member 1 adjacent the front wall 12. Similarly, the left end of the equalizer bar 134 is pivoted in a member 137 secured to the flange 8 of the frame member 1. It should be noted that the pivoted ends of the equalizer bar are displaced from the main body of the bar so that a rocking motion is imparted to the bar 134 when the space bar 114 is depressed.

An actuator 138 (see FIGURE 10) is provided which is similar in most respects with the keys 69. The actuator 138 differs from the key 69 in that it does not have the portion 73 which carries a key but instead has a slotted horizontal extension 139 which has the equalizer bar 134 disposed in the slot thereof. When the space bar 114 is depressed and the equalizer bar 134 is rotated about its pivoted ends, the key 139 is moved downwardly and has a cross portion 141 which becomes disposed in appropriate slots in the code bars 21.

It is apparent that the space bar 114 may be readily added to or removed from the mechanism by merely removing the brackets 126 and 127, the members 136 and 137 and the plate 129. Outside of these members, all elements required for the space bar mechanism are completely separate from the main body of the keyboard.

Summarizing the operation of the device, one of the actuators 69 is depressed and forces the bail 26 forward sufficiently to close the micro-switch 102 and thereby produce energization of the rotary solenoid 53. Upon energization of the rotary solenoid 53, the bail 13 is rotated clockwise pulling the bail 26 forwardly until it engages the shock absorber material 68 on the left face of the contact plate 57. Pivotal movement of the bail 13 withdraws the shaft from in front of the code bars 21 and permits the springs 48 to pull the bars selected forward. Each of the arms 71 of the actuators lies immediately in front of the teeth on the code bars 21 when the former is depressed into a slot 22 and wherever an actuator 69 enters a slot 22 in one of the code bars 21 the bar cannot move forward. However, where the metal between two of the slots 22 has been removed to produce a wide slot 23, the bar 21 may reciprocate and thus close its associated set of contacts 62. The pattern of code bars 21 which may move forward upon the depression of any key 69 of the mechanism, is different from the pattern that is permitted to move forward upon the depression of any other key in the mechanism and therefore, the pattern of closed contacts 62 resulting from the depression of a key is unique for each key of the mechanism.

The circuit for controlling the keyboard and, more particularly, the operation of the rotary solenoid 53 forms no part of the present invention but is described briefly below and with reference to FIGURE 11 in order to set forth the interaction of the various switches in the circuit. Alternating current, at 110 volts for instance, is applied between power input terminals 142. When the micro-switch 102 is closed due to movement to the right, as viewed in FIGURE 1, of the bail 26 alternating power is applied via the circuit comprising leads 143, 144, micro-switch 102, and upper set of contacts 146 of an anti-repeat relay 115, and a lead 148 to one end of a winding 149 of the solenoid 53. The other end of the winding 149 is connected via a lead 151 to the other power input terminal 142. Thus, upon closing of the micro-switch 102, the relay 53 is energized and causes a rocking motion of the bail 13. The rocking motion of the bail 13 closes the switch 109 and alternating current power is applied via leads 143, 152, the switch 109, lead 153, a second set of contacts 154 of the anti-repeat relay 115, a lead 156 and a further lead 157 to the stationary contacts of all of the code bar switches 62. Thus, upon closing of any one of these switches 62, a voltage is applied to the movable contact and to output terminals 158 connected to the movable terminals of the switch.

The voltage applied to the lead 157 is also applied to a common output terminal 159 which is adapted to be connected through a further switch which is connected externally of the keyboard and which is not illustrated to a feedback terminal 161. The external switch is closed only when the equipment being controlled by the keyboard indicates that it has received the information from the keyboard and has processed this information sufficiently to permit the apparatus to accept a second unit of information. When this occurs; that is, when the external switch is closed, voltage appearing on the terminal 159 is applied through the external switch to a feedback terminal 161 and via a lead 162 to an upper terminal of a coil 163 of the anti-repeat relay 115. The lower end of the coil 163 as viewed in FIGURE 11 is connected via a lead 164 to the lead 151 and thus back to the one of the input terminals 142. Therefore, the coil 163 of the anti-repeat relay 115 is energized and opens its lower set of contacts 154 thereby removing output voltages from the terminals 158 and the terminal 159 and also opens the upper set of contacts 146 thereby de-energizing the coil 149 of the rotary solenoid 53. In breaking the upper set of contacts 146, the anti-repeat relay 115 closes another set of contacts 163 and voltage is now applied from the upper input terminal 142 and via leads 143 and 144 micro-switch 102, the contacts 166 of the anti-repeat relay 115 and a lead 167 to the lead 162, thereby maintaining the anti-repeat relay 115 energized even though the feedback circuit which originally energized the solenoid is broken. De-energization of the rotary solenoid 53 causes the bail 13 to be pivoted counterclockwise about its axis which effects return of the code bars 21 and the bail 26 to their normal positions and also causes the switch 109 to be open. Also, the micro-switch 102 is now opened and the circuit to the coil 163 of the anti-repeat relay 115 is broken. However, it will be noted that the anti-repeat relay was energized until after the switch 109 is open, thereby preventing false operation of the relay 53 due to bounce in any of the switches. Thereafter, the opening of the switch 102 de-energizes the anti-repeat relay 115 and permits the apparatus to respond to the next depression of an actuator 69.

While we have described and illustrated one specific embodiment of our invention, it will be clear that variations of the details of construction which are specifically illustrated and described may be resorted to without departing from the true spirit and scope of the invention as defined in the appended claims.

What we claim is:

1. A keyboard mechanism comprising a bail reciprocatable between a first and a second position, said bail having a slot formed in one surface thereof extending at an angle from a surface in a direction opposite to the direction of movement of said bail from said first to said second position, an actuator movable between one position and another position, said actuator having a section which enters said slot upon movement of said actuator from said one to said another position, said section engaging a sloping surface defining said slot and moving said bail from its first position toward its second position, drive means actuated by movement of said bail from said first toward said second position, means for maintaining said drive means actuated for an interval independent of the operation of said bail, and means connecting said drive means to said bail for holding said bail in said second position during the interval said drive means is actuated.

2. A keyboard mechanism comprising a bail movable between a first and a second position, an actuator disposed adjacent a surface of said bail and movable between an unactuated and an actuated position, said surface of said bail sloping away from said actuator, said actuator engaging said sloping surface of said bail upon movement of said actuator from its unactuated toward its actuated position and moving said bail from its first position toward its second position, and drive means responsive to movement of said bail from said first toward said second position for positively driving said bail to said second position.

3. The combination according to claim 2 further comprising means responsive to movement of said bail toward its second position for positively moving said actuator to its actuated position.

4. The combination according to claim 3 wherein said last mentioned means includes means for latching said actuator in its actuated position so long as said bail is in said second position.

5. A keyboard mechanism comprising a bail movable between a first and a second position, an actuator disposed adjacent a surface of said bail and movable between an unactuated and an actuated position, said surface of said bail sloping away from said actuator in a direction opposite to the direction of movement of said bail from said first to said second position, said actuator engaging said sloping surface of said bail upon movement of said actuator from its unactuated toward its actuated position and moving said bail from its first position toward its second position, drive means actuated by movement of said bail from said first toward said second position, means for maintaining said drive means actuated for an interval independent of the operation of said bail, and means connecting said drive means to said bail for holding said bail in said second position during the interval said drive means is actuated.

6. A keyboard mechanism comprising a bail reciprocatable between a first and a second position, said bail having a slot formed in one surface thereof extending at an angle from said surface in a direction opposite to the direction of movement of said bail from said first to said second position, said slot defining forward and rearward surfaces, said rearward surface of said slot and said surface of said bail defining a hook-like member, an actuator movable between one position and another position, said actuator having a section which enters said slot upon movement of said actuator from said one to said another position, said section engaging said forward surface of said slot and moving said bail from its first toward its second position, said section of said actuator having an aperture therein, drive means responsive to movement of said bail from said first to said second position for positively driving said bail to said second position and holding it in said second position, said hook-like member of said bail entering said aperture in said section of said actuator and holding said actuator in said actuated position.

7. A keyboard mechanism comprising a longitudinally extending ball cage, a plurality of balls disposed in line in said cage, a plurality of slots in said ball cage extending through one side of said cage extending perpendicular to its longitudinally axis and spaced apart by a distance approximately equal to the diameter of said balls, a plurality of actuators movable between an actuated and an unactuated position, each of said actuators including a flat member having an aperture therein defining a first and a second web portion disposed in a different one of said slots, said second web portions located in said slot on the said one side of said cage, said first web portions being disposed on a side of said balls remote from the opening of their associated slots when said actuators are in their unactuated positions and being interposed between two adjacent balls when said actuators are in their actuated positions, the effective length of said ball cage being substantially equal to the total of the diameters of said balls plus the thickness of said web portions of one of said actuators, a bail movable between a first and a second position, said bail having a surface disposed adjacent said second web portions of said actuators and having a plurality of sloping surfaces each adjacent a different one of said second web portions of said actuators, said sloping surfaces sloping away from said actuators in a direction opposite to the direction of movement of said bail from said first to said second position, said second web portion of an actuator engaging its associated sloping surface upon moving from said unactuated toward said actuated position and moving said bail from its first position toward its second position, and drive means responsive to movement of said bail from said first toward said second position for holding said bail in said second position.

8. A keyboard mechanism comprising a longitudinally extending ball cage, a plurality of balls disposed in line in said cage, a plurality of slots in said ball cage extending perpendicular to its longitudinal axis and spaced apart by a distance approximately equal to the diameter of said balls, a plurality of actuators movable between an actuated and an unactuated position, each of said actuators having a flat member extending through a different one of said slots in said cage, each of said flat members having an aperture aligned with said balls, said aperture having a size at least as large as the diameter of said balls, said flat members each having a web portion disposed on a side of said balls remote from the opening of its associated slot when said actuator is in its unactuated position, said web portion being interposed between two adjacent balls when said actuator is in its actuated position, the effective length of said ball cage being substantially equal to the total of the diameters of said balls plus the thickness of said web portion of one of said actuators, a longitudinally extending bail aligned with said ball cage and reciprocatable between a first and a second position, said bail having a plurality of slots each aligned with the path of movement of one of said flat members of said actuators and equal in number to said actuators, each of said slots in said bail extending at angles away from said actuators in a direction opposite to the direction of movement of said bail from its first to its second position, each of said flat members of said actuators having a section which enters an associated slot in said bail upon movement of said actuator from its unactuated position toward its actuated position said section of said flat member engaging a wall of said slot and moving said bail towards its second position, said web position of said actuator simultaneously entering a region between two adjacent balls in said ball cage, drive means actuated by movement of said bail from said first toward said second position, means for maintaining said drive means actuated for an interval independent of the operation of said bail, and means connecting said drive means to said bail for holding said bail in said second position during the interval said drive means is actuated.

9. A keyboard mechanism comprising a longitudinally extending ball cage, a plurality of balls disposed in line in said cage, a plurality of slots in said ball cage extending perpendicular to its longitudinal axis and spaced apart by a distance approximately equal to the diameter of said balls, a plurality of reciprocable actuators movable between an actuated and an unactuated position, each of said actuators having a flat member extending through a different one of said slots in said cage, each of said flat members having an aperture aligned with said balls, said aperture having a size at least as large as the diameter of said balls, said flat members each having a web portion disposed on a side of said balls remote from the opening of its associated slot when said actuator is in its unactuated position, said web portion being interposed between two adjacent balls when said actuator is in its actuated position, the effective length of said ball cage being substantially equal to the total of the diameters of said balls plus the thickness of said web portion of one of said actuators, a longitudinally extending bail aligned with said ball cage and reciprocatable between a first and a second position, said bail having a plurality of slots each aligned with the path of movement of one of said flat members of said actuators and equal in number to said actuators, each of said slots in said bail extending at angles away from said actuators in a direction opposite to the direction of movement of said bail from its first to its second position, each of said slots defining a forward and a rearward wall, each of said rearward walls and a longitudinally extending wall of said bail defining a plurality of hook-like members, each of said flat members of said actuators having a section which enters an associated slot in said bail upon movement of said actuator from its unactuated position toward its actuated position, each of said sections of said flat members having an aperture formed therein, said section of an actuator engaging said forward wall of its associated slot in said bail upon movement of said actuator from said unactuated position toward said actuated position and moving said bail toward its second position, said web portion of said actuator simultaneously entering a region between two adjacent balls in said ball cage, and drive means responsive to movement of said bail from said first position toward said second position for positively holding said bail in said second position, said hook-like member associated with the slot into which an actuator has been depressed entering said aperture in said section of said actuator and holding said actuator in said actuated position.

10. A coding keyboard mechanism comprising a plurality of longitudinally extending code bars having a plurality of teeth formed thereon, said code bars being longitudinally reciprocatable between a first and a second position, all of said teeth being transversely aligned when said code bars are in said first position, a longitudinally extending bail longitudinally reciprocatable between a first and a second position, a plurality of slots in said bail opening into a surface thereof, the intersections of said slots and said surface being aligned transversely of said bail with the spaces between said teeth on said code bars, a plurality of actuators movable between an actuated and an unactuated position, each of the intersections of said slots and said surface of said bail and each of the aligned spaces between the teeth of said code bars being disposed in the path of movement of a different one of said actuators, said slots in said bail sloping away from said actuators in a direction opposite to the direction of movement of said bail from said first to said second position, each of said actuators engaging a sloping surface of its associated slot upon movement from said unactuated toward said actuated position and moving said bail from said first toward said second position, and drive means responsive to said movement of said bail for holding said bail in its second position and for urging said code bars to move from said first position to said second position.

11. The combination according to claim 10 wherein said drive means comprises a solenoid, a one-way coupling means between said solenoid and said bail for driving said bail from said first to said second position upon energization of said solenoid, means for normally urging said bail toward said first position, a one way coupling means between said solenoid and said code bars for driving said code bars from said second to said first position upon de-energization of said solenoid, means for biasing said code bars toward said second position, and a switch means responsive to movement of said bail from said first position toward said second position for energizing said solenoid.

12. A keyboard mechanism comprising a bail reciprocable between a first and second position, said bail having a slot formed in one surface thereof extending at an angle from said surface in a direction opposite to the direction of movement of said bail from said first to said second position, said slot defining forward and rearward surfaces, said rearward surface of said slot and said surface of said bail defining a hook-like member, an actuator movable between one position and another position, said actuator having a section which enters said slot upon movement of said actuator from said one to said another position, said section engaging said forward surface of said slot and moving said bail from its first toward its second position, said section of said actuator having an aperture therein, drive means actuated by movement of said bail from said first toward said second position, means for maintaining said drive means actuated for an interval independent of the operation of said keyboard mechanism, and means connecting said drive means to said bail for holding said bail in said second position during the interval said drive means is actuated, said hook-like member of said bail entering said aperture in said section of said actuator and holding said actuator in said actuated position.

References Cited in the file of this patent

UNITED STATES PATENTS

| | | |
|---|---|---|
| 1,884,807 | Morton | Oct. 25, 1932 |
| 2,045,021 | Muller | June 23, 1936 |
| 2,451,150 | Brian | Oct. 12, 1948 |
| 2,607,848 | Zenner | Aug. 19, 1952 |
| 2,621,242 | Lesigne | Dec. 9, 1952 |
| 2,684,745 | Blodgett | July 27, 1954 |
| 2,741,427 | Drake | Apr. 10, 1956 |
| 2,903,687 | Baer et al. | Sept. 8, 1959 |
| 2,935,577 | Dumke et al. | May 3, 1960 |